US008582318B2

(12) United States Patent
Muehlhoefer et al.

(10) Patent No.: US 8,582,318 B2
(45) Date of Patent: Nov. 12, 2013

(54) CIRCUIT AND METHOD FOR POTENTIAL-ISOLATED ENERGY TRANSFER WITH TWO OUTPUT DC VOLTAGES

(75) Inventors: Alexander Muehlhoefer, Oberasbach (DE); Gunther Koenigsmann, Erlangen (DE)

(73) Assignee: Semikron Elektronik GmbH & Co. KG, Nürnberg (DE)

( * ) Notice: Subject to any disclaimer, the term of this patent is extended or adjusted under 35 U.S.C. 154(b) by 40 days.

(21) Appl. No.: 13/087,265

(22) Filed: Apr. 14, 2011

(65) Prior Publication Data

US 2012/0092895 A1 Apr. 19, 2012

(30) Foreign Application Priority Data

Apr. 14, 2010 (DE) .......................... 10 2010 014 941

(51) Int. Cl.
*H02M 3/335* (2006.01)
(52) U.S. Cl.
USPC .............................................................. 363/16
(58) Field of Classification Search
USPC ................ 363/15, 16, 24, 25, 131, 133, 134;
307/4, 55; 323/247, 251, 252, 254,
323/255, 263, 271, 282, 351
See application file for complete search history.

(56) References Cited

U.S. PATENT DOCUMENTS

| | | |
|---|---|---|
| 3,938,025 A | 2/1976 | Gustafsson |
| 5,784,266 A * | 7/1998 | Chen ................................ 363/16 |
| 6,288,913 B1 | 9/2001 | White |
| 6,343,023 B1 * | 1/2002 | Wunderlich .................... 363/16 |
| 2005/0243580 A1 | 11/2005 | Lyle |

FOREIGN PATENT DOCUMENTS

| | | |
|---|---|---|
| DE | 2447968 | 4/1975 |
| EP | 0184963 | 6/1986 |
| WO | WO2008/105741 | 9/2008 |
| WO | WO2009/105734 | 8/2009 |

OTHER PUBLICATIONS

M.Ryan, W.Brumsickle, D.Divan and R.Lorenz, "A new ZVS LCL-resonant push-pull dc-dc converter topology", IEEE transaction on industry applications, 34(5), Sep./Oct. 1998.*

* cited by examiner

*Primary Examiner* — Timothy J Dole
*Assistant Examiner* — Carlos Rivera-Perez
(74) *Attorney, Agent, or Firm* — The Law Offices of Roger S. Thompson

(57) ABSTRACT

A circuit for potential-isolated power transfer from a primary side to a secondary side with two secondary-side output DC voltages, wherein the absolute value of the first output DC voltage is higher than the absolute value of the second output DC voltage. The circuit comprises a transformer, which has first and second windings with a common center tap on the primary side and a third winding on the secondary side. The ratio of the number of turns of the first and second windings is a function of the ratio of the two secondary-side output DC voltages. The center tap is connected to a DC voltage source, the first winding is connected to a first transistor and the second winding is connected to a second transistor. The transistors are connected to the primary-side reference potential. The output voltages are present at two diodes connected to the secondary-side third winding.

6 Claims, 3 Drawing Sheets

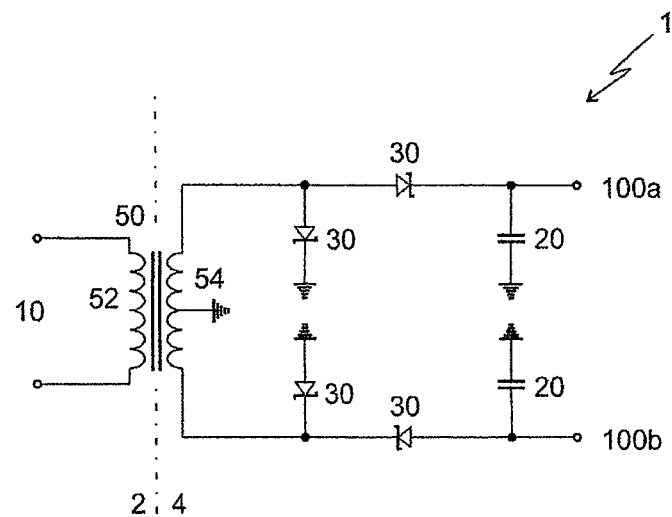
Fig. 1 *(Prior art)*
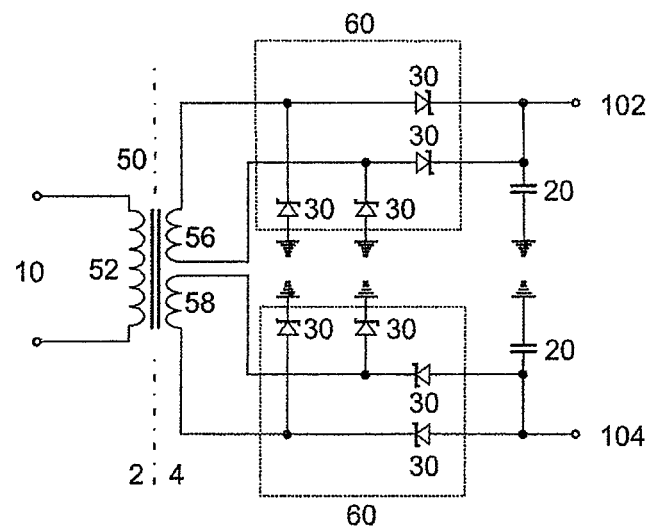
Fig. 2 *(Prior art)*

US 8,582,318 B2

CIRCUIT AND METHOD FOR POTENTIAL-ISOLATED ENERGY TRANSFER WITH TWO OUTPUT DC VOLTAGES

BACKGROUND OF THE INVENTION

1. Field of the Invention

The invention is directed to a circuit and an associated method for potential-isolated energy transfer from a primary side to a secondary side of the circuit, wherein two output DC voltages having in each case different absolute values are intended to be present. These two output DC voltages can have identical or differing polarity.

2. Description of the Related Art

Circuits of this type are, for example, part of drive circuits for power semiconductor modules. One known basic circuit of a power semiconductor module is the half-bridge circuit of two power transistors, in which at least one of the two power transistors is not at a constant reference potential. Its reference potential can fluctuate on the order of magnitude of one kilovolt. Therefore, it is generally known to design the associated drive circuits with a primary side and at least one secondary side electrically isolated therefrom. In this case, the primary side has at least the task of forwarding the control pulses to the respective secondary side, and also of power transfer, for supplying energy to the secondary side.

To accomplish this power transfer, transformers are frequently used and well known. In their simplest configuration, transformers are embodied with a primary-side and a secondary-side winding and fed by an AC voltage source. On the secondary side, this AC voltage, in order to generate a DC voltage such as is necessary for example for driving the gate of a power transistor, is rectified and, if appropriate, filtered.

In a large number of power transistors, it is preferred, as is known, to switch them on with a positive voltage and to switch them off with a negative voltage. In this case, for energy-related reasons, it can be advantageous to choose the absolute value of the switch-off voltage to be less than the value of the switch-on voltage as defined by the design of the power transistor.

SUMMARY OF THE INVENTION

It is an object of the present invention to provide a circuit for potential-isolated power transfer between a primary side and a secondary side of a circuit, and an associated method for driving such a circuit, wherein two output DC voltages having different absolute values are intended to be available on the secondary side and, at the same time, the number of components required on the secondary side for this purpose is small.

The inventive circuit is for potential-isolated power transfer from a primary side to a secondary side, in which two secondary-side output DC voltages having different absolute values are provided. In the inventive circuit, the first output voltage has a higher absolute value, and has a transformer for the power transfer. The transformer, for its part, has on its primary side first and second windings with a common center tap and, on its secondary side, a third winding. In this case, the ratio of the number of turns of the first and second windings is adapted to the ratio of the two secondary-side output DC voltages. The adaptation results in accordance with a rule of three from the identity of the ratio of the transformer voltages with respect to the ratio of the number of turns of the assigned windings.

The center tap of the transformer is connected to a DC voltage source; furthermore, the first winding of the transformer is connected to a load connection of a first transistor and the second winding thereof is connected to a load connection of a second transistor and these two transistors, are each connected by their respective second load connections to the primary-side reference potential.

In order to generate two secondary-side output DC voltages of identical polarity, the two connections of the secondary-side winding of the transformer are respectively connected to the anodes of a first diode and a second diode, at the respective cathodes of which the respective output DC voltage is present.

In order to generate two secondary-side output DC voltages of differing polarity, one connection of the secondary-side winding is at the reference potential on the secondary side while the other connection is connected to the anode of a first diode and the cathode of a second diode, at the respective other connections of which the respective output DC voltage is present.

In both configurations, for the purpose of smoothing the output voltage, it is in each case preferred if the outputs of the first and second diodes are respectively connected to a first connection of a capacitor, the respective second connection of which is at the secondary-side reference potential.

It is preferred, in order to generate the first secondary-side output DC voltage, that voltage having a higher absolute value, to provide a primary-side input voltage of the same absolute value be utilized. Consequently, for the number of turns of the first winding of the transformer, this results in the same number of turns as in the case of the secondary-side third winding. The primary-side second winding correspondingly has a greater number of turns—adapted to the ratio of the secondary-side output voltages—than the first winding.

Alternatively, it may be preferred for the number of turns of the first winding to have an integral multiple or an integral fraction of the number of turns of the third winding. The ratio of the number of turns of first to second windings remains uninfluenced by this, of course.

In the associated method according to the invention for potential-isolated power transfer with two output DC voltages by means of the inventive circuit, the transistors for power transfer are switched in a manner offset with respect to one another with a duty ratio that is inversely proportional to the number of turns of the assigned winding of the transformer. For the efficient practice of this method, it is preferred if the minimum frequency of a switching period of both transistors is greater than 10 kHz, in preferred applications on the order of magnitude of 1 MHz.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows a first circuit for generating two secondary-side output DC voltages of differing polarity and having an identical absolute value in accordance with the prior art;

FIG. 2 shows a second circuit for generating two secondary-side output DC voltages of differing polarity and having different absolute values in accordance with the prior art;

DETAILED DESCRIPTION OF THE PRESENTLY PREFERRED EMBODIMENTS

Figure 3:
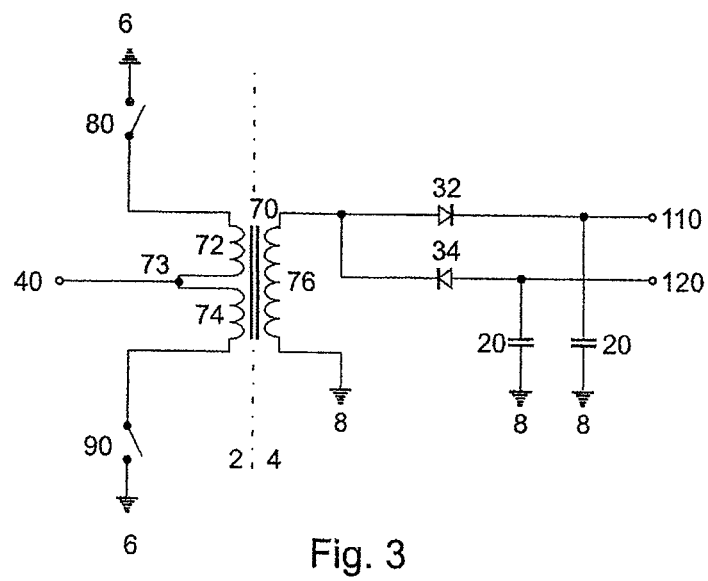
FIG. 3 shows a circuit according to a preferred embodiment of the invention for generating two secondary-side output DC voltages of differing polarity and having different absolute values.

FIG. 1 shows a first circuit for generating two secondary-side output DC voltages of differing polarity and having an identical absolute value in accordance with the prior art. For power transfer from a primary side 2 to a secondary side 4, a transformer 50 is provided. Transformer 50 has a primary-side winding 52 and a secondary-side winding 54 having the same number of turns.

Figure 5A:
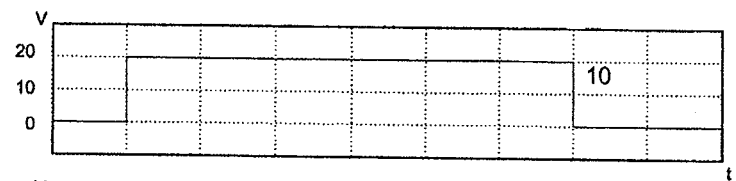
FIG. 5 shows various voltage profiles of the above circuits.
Figure 5B:
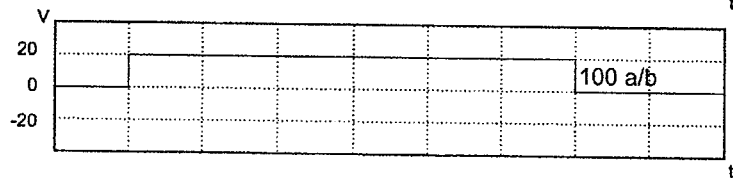
Figure 5C:
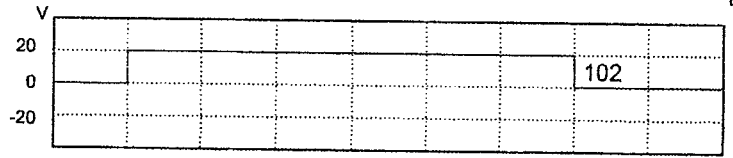

On the primary side, winding 52 is fed by an AC voltage source 10, for example in the embodiment of a rectangular signal, the source is active as long as power is to be transferred to secondary side 4, cf. FIG. 5a, which illustrates the absolute value of this voltage. On secondary side 4, the respective output AC voltage at the two connections of winding 54 is rectified in principle by identical means, here zener diodes 30, as a result of which two secondary-side output DC voltages 100a/b having identical absolute values but of differing polarity are then available.

FIG. 2 shows a second circuit arrangement for generating two secondary-side output DC voltages of differing polarity and having different absolute values, also in accordance with the prior art. In this case, transformer 50 is developed relative to the circuit in accordance with FIG. 1 to the effect that it has on secondary side 4 two windings 56, 58, which are not connected to one another. Consequently, it is possible to generate voltages having different absolute values on secondary side 4 since windings 56, 58 have a different number of turns. The output DC voltages are present after rectification and, if appropriate, smoothing. What is disadvantageous about this, however, is that a dedicated bridge rectifier 60 having four diodes 30 in each case is required for each of the two output DC voltages 102, 104.

FIG. 3 shows a circuit according to the invention for generating two secondary-side output DC voltages of differing polarity and having different absolute values. On the primary side 2, here a DC voltage source 40 having a voltage of 15 V, for example, is provided, the latter being present at the center tap 73 of a transformer 70 having first and second windings 72, 74 having a different numbers of turns. On secondary side 4, a first output DC voltage of 15 V and a second output DC voltage of approximately −8 V are intended to be generated.

On primary side 2, two transistors 80, 90 are provided for this purpose. First transistor 80, preferably an n-channel MOS-FET, is connected to first winding 72 and a primary-side reference potential 6. Second transistor 90, preferably, a p-channel MOS-FET is connected to second winding 74 and primary-side reference potential 6.

First winding 72 has a number of turns that is equal to the number of turns of secondary-side third winding 76. In the simplest case, this would respectively be 15 turns, as a result of which the 15 V of the primary side 2, without taking account of losses, are transferred to the secondary side 4.

Primary-side second winding 74 has a number of turns that is greater than the number of turns of secondary-side third winding 76. In the simplest case, this would be 28 turns, as a result of which the 15 V of primary side 2, without taking account of losses, generate an output voltage 120 of approximately 8 V absolute on secondary side 4.

For power transfer, the two primary-side transistors 80, 90 are switched alternately in this way in a manner offset with respect to one another and with a duty ratio that is inversely proportional to the number of turns of assigned windings 72, 74 of transformer 70. In the case of the exemplary values mentioned, this corresponds to a pulse length ratio of 15 to 28, as a result of which the energy stored in transformer 70 is completely transferred from primary side 2 to secondary side 4. Driving of this type can be effected by means of a microcontroller, for example, which in this case is used as a clock generator and generates the switching pulses for two primary-side transistors 80, 90.

The primary-side input voltage can also be chosen to be different from the first output voltage of the secondary side 4 by an integral factor or by an integral divisor. For this purpose, the number of turns of the windings then has to be adapted to that factor, or to that divisor. By way of example, an input voltage of 7.5 V, that is to say half of the input voltage mentioned above, would require a doubling of the number of turns on the secondary side.

As a result, the secondary-side circuit complexity, by virtue of the corresponding higher primary-side complexity, is significantly lower than in accordance with the prior art.

Secondary-side third winding 76 of transformer 70 is connected to the secondary-side reference potential 8 by one connection and to two differently biased diodes 32, 34 by the other connection. First diode 32 is connected by its anode to third winding 76 of the transformer 70 and with its cathode forms the first DC voltage output 110, wherein here a capacitor 20 connected relative to a secondary-side reference potential 8 can provide voltage smoothing. Consequently, a voltage of +15 V is present here at first DC voltage output 110.

A second diode 34 is connected by its cathode to secondary-side third winding 76 and with its anode forms second DC voltage output 120, wherein a capacitor 20 connected relative to secondary-side reference potential 8 can likewise also here provide voltage smoothing. Consequently, a voltage of approximately −8 V is present here at second DC voltage output 120.

Figure 4:
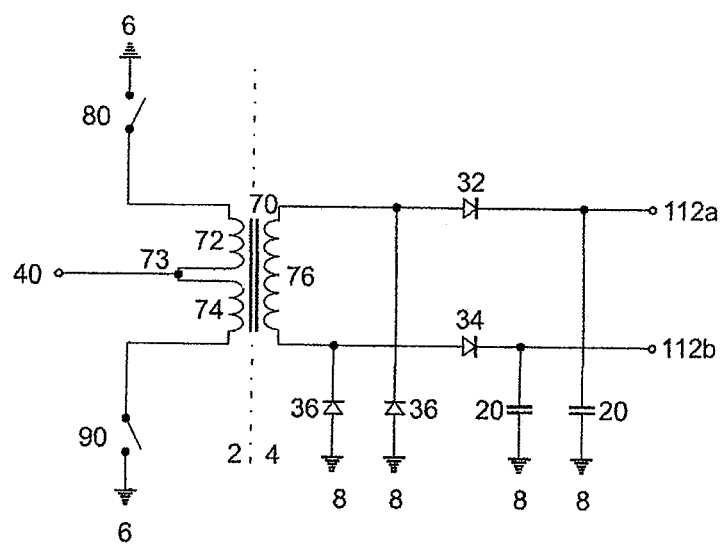
FIG. 4 shows a circuit according to a further preferred embodiment of the invention for generating two secondary-side output DC voltages of identical polarity and having different absolute values.

FIG. 4 shows a circuit according to the invention for generating two secondary-side output DC voltages of identical polarity and having different absolute values. In this case, primary-side circuit 2 is identical to that shown in with FIG. 3. On secondary side 4, however, the anode of first diode 32 is connected to a first connection of secondary-side third winding 76 of the transformer 70 and the anode of second diode 34 is connected to the second connection of secondary-side third winding 76. The respective anodes are also connected to secondary-side reference potential 8 via further diodes 36. Furthermore, smoothing capacitors 20 are also provided here. The cathodes of diodes 32, 34 form the respective DC voltage outputs 112 alb with 15 V and 8 V.

The essential advantage of these two circuits is that, by virtue of the extra circuit-technological complexity on primary side 2, the circuit-technological complexity on secondary side 4 can be significantly reduced. With this primary-side circuit 2, it is also possible to supply a plurality of parallel-connected transformers 70 with the clocked input voltage, as a result of which this circuit part is required only once, despite a plurality of possible secondary sides 4, while the complex secondary-side circuit parts described above in the case of the prior art (as exemplified in FIGS. 1 and 2) need to be provided once in each case per secondary side 4.

FIG. 5 shows various voltage profiles of the above circuit arrangements. FIG. 5a shows the absolute value of the input voltage 10 of a circuit arrangement in accordance with FIG. 1 or 2, whereas FIG. 5b shows one of the two secondary-side output DC voltages 100a/b having identical absolute values in accordance with FIG. 1. FIG. 5c shows the secondary-side output DC voltages 102, 104 in accordance with FIG. 2.

Figure 5D:
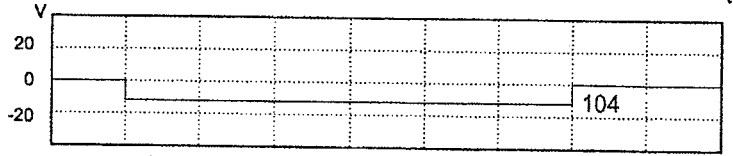
Figure 5E:
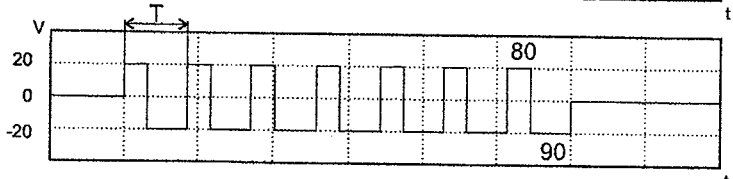
Figure 5F:
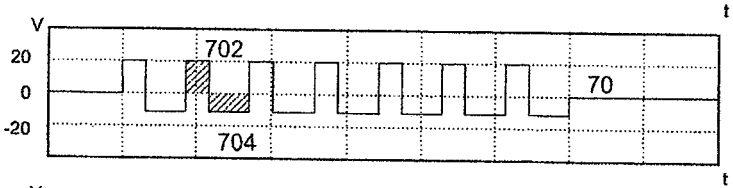

FIG. 5d shows the primary-side voltage profile through transistors 80, 90, wherein "T" here represents a switching period, that is to say a switching cycle of first and second transistors 80, 90. In this case, a switching frequency of at least about 10 kHz, even better of at least about 100 kHz, should be provided. FIG. 5e shows the secondary-side output voltage at transformer 70. In this case, the driving according to the invention has the result that the respective energy packets 702, 704, identified as hatched regions, which are fed to the two outputs are identical on account of the different voltages in conjunction with the adapted switching times of primary-side transistors 80, 90 for both output voltages 110, 120. Finally, FIG. 5f schematically shows the smoothed output DC voltages of a circuit arrangement in accordance with FIG. 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for potential-isolated power transfer with two output DC voltages by means of a circuit for the potential-isolated power transfer from a primary side to a secondary side with first and second secondary-side output DC voltages, wherein the absolute value of the first output DC voltage is higher than the absolute value of the second output DC voltage, the circuit comprising:
    a transformer for power transfer, which has on a primary side a first winding and a second winding with a common center tap, and on a secondary side a third winding, the ratio of the number of turns of the first winding to the second winding is a function of the ratio of the first and second secondary-side output DC voltages, the center tap is connected to a DC voltage source, the first winding is connected to a first transistor and the second winding is connected to a second transistor and the first and second transistors are each connected by a second load connection to a primary-side reference potential,
    wherein the two connections of the secondary-side third winding are respectively connected to the anode of a first diode and a second diode, at the respective cathodes of which the respective output DC voltage is present;
    wherein the number of turns of the first winding is less than the number of turns of the second winding, and wherein the number of turns of the third winding is equal to the number of turns of the first winding; and
    the number of turns of the first winding is less than the number of turns of the second winding, and wherein the number of turns of the third winding is an integral multiple or an integral fraction of the number of turns of the first winding
    wherein the method comprises the step of:
        switching the transistors for power transfer in a manner offset with respect to one another with a duty ratio that is inversely proportional to the number of turns of the assigned winding of the transformer.

2. The method of claim 1, wherein
the minimum frequency of a switching period (T) of both transistors is at least about 10 kHz.

3. The method of claim 1, wherein the outputs of said first diode and said second diode are respectively connected to a first connection of a capacitor, the respective second connection of which is at the secondary-side reference potential.

4. A method for potential-isolated power transfer with two output DC voltages by means of a circuit for the potential-isolated power transfer from a primary side to a secondary side with first and second secondary-side output DC voltages, wherein the absolute value of the first output DC voltage is higher than the absolute value of the second output DC voltage, the circuit comprising:
    a transformer for power transfer, which has on a primary side a first winding and a second winding with a common center tap, and on a secondary side a third winding, the ratio of the number of turns of the first winding to the second winding is a function of the ratio of the first and second secondary-side output DC voltages, the center tap is connected to a DC voltage source, the first winding is connected to a first transistor and the second winding is connected to a second transistor and the first and second transistors are each connected by a second load connection to a primary-side reference potential,
    wherein one connection of the secondary-side third winding is at reference potential of the secondary side and the other connection is connected to the anode of a first diode and the cathode of a second diode at the respective other connection of which the respective output DC voltage is present;
    wherein the number of turns of the first winding is less than the number of turns of the second winding, and wherein the number of turns of the third winding is equal to the number of turns of the first winding; and
    the number of turns of the first winding is less than the number of turns of the second winding, and wherein the number of turns of the third winding is an integral multiple or an integral fraction of the number of turns of the first winding
    wherein the method comprises the step of:
    switching the transistors for power transfer in a manner offset with respect to one another with a duty ratio that is inversely proportional to the number of turns of the assigned winding of the transformer.

5. The method of claim 4, wherein
the minimum frequency of a switching period (T) of both transistors is at least about 10 kHz.

6. The method of claim 4, wherein the outputs of said first diode and said second diode are respectively connected to a first connection of a capacitor, the respective second connection of which is at the secondary-side reference potential.

* * * * *